Jan. 5, 1971  N. O. CROSS  3,552,821
BORESCOPE FOR USE AT HIGH TEMPERATURES AND PRESSURES
Filed Sept. 5, 1967  2 Sheets-Sheet 1
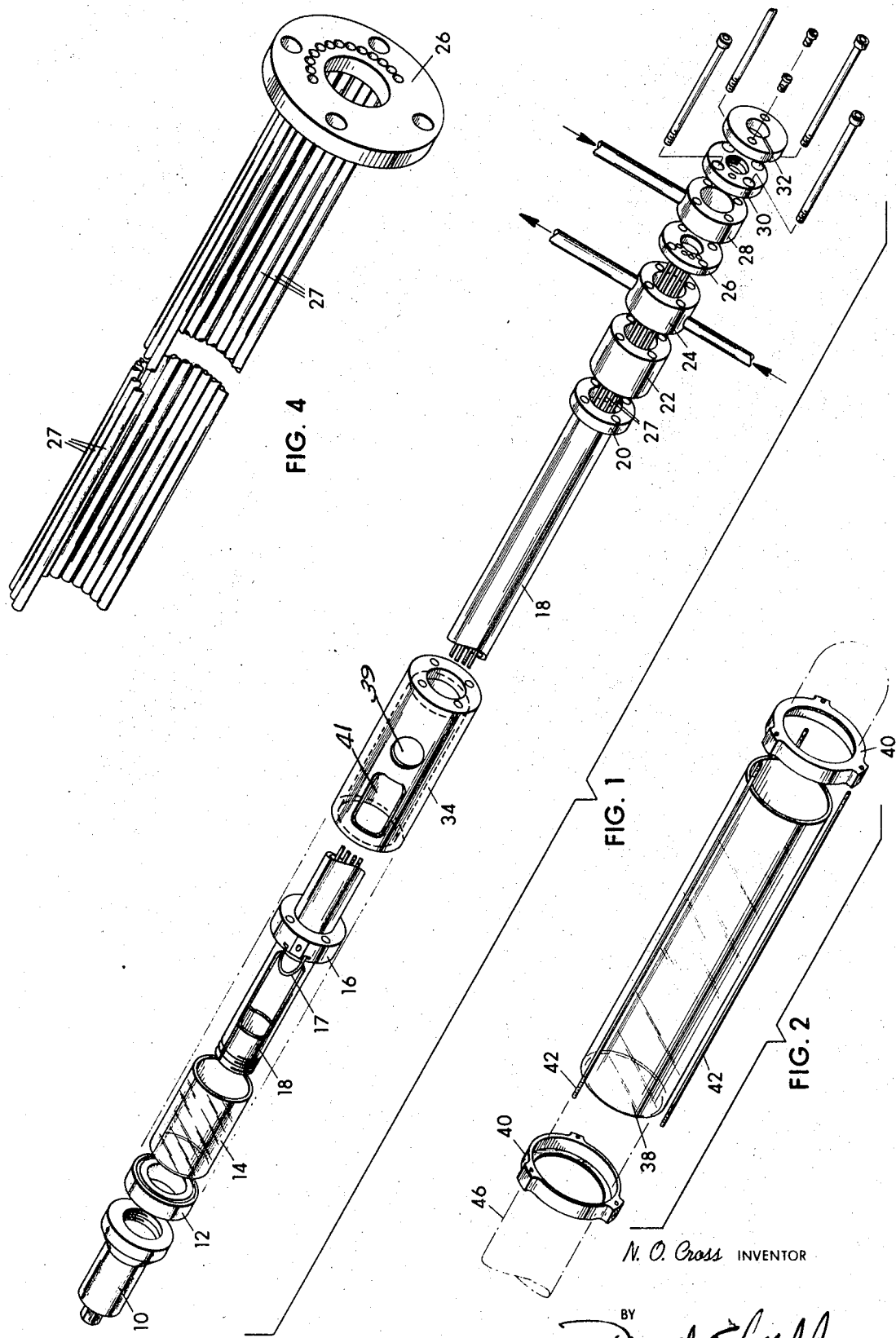
N. O. Cross INVENTOR
BY
PATENT ATTORNEY Jan. 5, 1971      N. O. CROSS      3,552,821

BORESCOPE FOR USE AT HIGH TEMPERATURES AND PRESSURES

Filed Sept. 5, 1967      2 Sheets-Sheet 2

N. O. Cross INVENTOR

BY

PATENT ATTORNEY

United States Patent Office 3,552,821
Patented Jan. 5, 1971

3,552,821
BORESCOPE FOR USE AT HIGH TEMPERATURES AND PRESSURES
Newbold O. Cross, Berkeley Heights, N.J., assignor to Esso Research and Engineering Company, a corporation of Delaware
Filed Sept. 5, 1967, Ser. No. 665,377
Int. Cl. G02b
U.S. Cl. 350—63  4 Claims

ABSTRACT OF THE DISCLOSURE

A borescope for use in visual inspection of the internal conditions of operating pressure vessels and process equipment which comprises an optical borescope provided with a temperature and pressure-resistant outer housing and associated components. The borescope is cooled by a cooling fluid circulated through a portion of the space between the borescope housing and the outer housing, and returned through another portion of said space and is protected from dust and pressure damage by the outer housing.

BACKGROUND OF THE INVENTION

This invention relates to the use of an optical borescope in high temperature and/or high pressure environments for internal visual inspection of operating vessels and process equipment. More particularly, the invention relates to apparatus for protecting the borescope from severe operating conditions and cooling it with a cooling fluid. The fluid is circulated between the outer protective housing and the housing of the optical apparatus.

The optical system of the borescope consists of an objective, a middle lens system, correcting prisms, and an ocular or eye piece. The objective consists of a plurality of prisms and lenses mounted closely together. Its design determines the angle of vision, the field of view, and the amount of light gathered by the system. Borescopes that view directly ahead, at right angles, obliquely ahead and obliquely back along the axis of the borescope are known to the art and may be used in the present invention. The right angle type is probably the most commonly used type in practice today. The middle lenses conserve the light entering the system and conduct it through the telescope tube to the eye with a minimum loss of transmission. Depending upon the length of the borescope, the image requires reversal, or inversion or both at the ocular. This is accomplished by using a correcting prism within the ocular for borescopes of small diameter and by erecting lenses for larger models. Borescopes in general serve two purposes: they magnify objects whose detail cannot be recognized by the unaided eye, and they permit visual inspection of objects in spaces not otherwise accessible.

Conventional borescopes have been restricted to use at low temperature and pressure. There are several reasons why this has been the case. These reasons are:

(1) Mechanical threaded, pressed or cemented joints are not pressure tight.
(2) Most glass optical components are not suitable for high temperature use.
(3) Electrical insulating materials and incandescent light source have only low temperature capabilities and pose a safety problem, since they could ignite flammables if a failure occurs. Generally speaking, borescopes have an internal lighting system designed to illuminate the area to be viewed.
(4) The optical assembly is not capable of large magnitude expansions and contractions which are encountered when thermally cycle from ambient to elevated temperatures.

The present invention is useful with any type of borescope or other viewing system, whether self-illuminated or not, which is designed for use in high temperature and/or high pressure environments. In view of the delicate nature of the optical system, it has been found that expensive optical instruments such as the borescope, while very desirable for viewing the internal workings of a pressure vessel or other operating system which is operating at high temperature and/or high pressure, or is filled with dust or fluid, simply cannot be used without the type of protection afforded the optical system by the present invention.

SUMMARY OF THE INVENTION

The object of the present invention is to provide a high temperature-high pressure borescope. More specifically, it is the object of this invention to provide a borescope which may be used to observe the internal workings or conditions of vessels and apparatus while they are in operation under severe conditions of high temperature and/or high pressure or are filled with dust or fluid.

The invention is useful in combination with borescopes having self-contained illumination or without it. It is useful with borescopes having any one of the four types of vision (direct, right angle, foroblique, and retrospective). Probably the most commonly used type of borescope is the right angle borescope with an integral illumination system.

To attain resistance to external pressure in on-stream environments, external housing surrounding the borescope is required. This housing should be made of a material resistant to heat, pressure, and corrosion, such as stainless steel. This housing may also serve the purpose of containing a cooling liquid to be circulated about the outside of the borescope. The cooling liquid protects the borescope from intense heat in certain onstream uses. Illumination and visualization at the objective viewing end can be achieved by installing a transparent port or tube in the outer shell of the protective housing. The transparent material must be sufficiently strong to protect the borescope, and must be resistant to heat and to heat differentials. An additional requirement may be for a means to clean the outside of the viewing port in dusty or dirty gaseous atmospheres without removing the borescope from the vessel or apparatus being examined. This problem may be solved by piping air or an inert gas to an external jet directed over the objective viewing/illumination area. These concepts are shown in some detail in the accompanying drawings which will be discussed further.

It is apparent that, depending on the environments to be studied and the materials to be used, the present invention is applicable to a great variety of processes and environments which it is desirable to study visually or to photograph. With the present invention, such studies or photographs may be made while a process is in operation. A trained eye may then study the environment or still or motion photographs and determine the effect of various processes on the apparatus being used, and may also follow the course of a process where such process is capable of visual examination. A partial list of applications is as follows:

Remote on-stream inspection of furnace tubes, hangers, burners, brick work, stack dampers, and other furnace internals.

Inspection of pipestill trays, bubble caps, liquid levels, etc.

Checking the condition of grid seal and cyclones in catalyst plant regenerators.

Examine valves for stuck gates or broken stems.

Investigate the condition of linings, screens, internals, or find if plugging, solids build-up, high/low liquid levels are causing process upsets.

Underwater inspection of screens, weirs, piping and other submerged equipment.

This list is intended to be suggestive only, and is not exhaustive. It is in no way intended to limit the use of the invention. The invention may be used in many areas of operation. Its usfulness is widespread and applicable to all types of conditions, equipment, and processes. The invention may be more fully understood by reference to the drawings.

BRIEF DESCRIPTION OF THE DRAWINGS

FIG. 1 shows an exploded view of the instant invention.

FIG. 2 shows the inner objective glass tube and cage assembly.

FIG. 4 shows the coolant inlet tubes and plate assembly.

DESCRIPTION OF THE PREFFERED EMBODIMENTS

Figure 3:
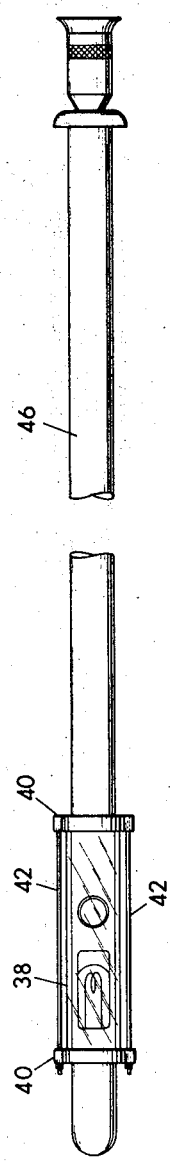
FIG. 3 shows the borescope with the inner objective glass tube and cage assembly in place.

Referring to FIG. 1, reference numeral 10 denotes the clamp cap. 12 denotes the take-up gasket ring. The ring 12 is provided with a circular notch on one side in which a gasket is disposed. 14 denotes the outer objective tube which may be made of quartz or a quartz equivalent or any other transparent material which will meet the requirements of transparency and resistance to high temperature and pressure which will be involved in the use of the invention. A non-transparent tube with a transparent window or windows may also be used. One end of the tube 14 fits flush against the gasket in the circular notch on ring 12 to provide a fluid-tight seal. 16 denotes the fixed gasket ring. This ring is milled flat on one area to admit purge gas to the objective and also contains slots for the installation of the purge gas deflector which is denoted by 17. The deflector 17 is an asbestos covered semi-circular flexible wire with both ends anchored on the gasket ring 16. 18 denotes the outer pressure tube. The pressure tube 18 is threaded at one end so that it may be connected to a tapped hole in cap 10, thus providing a fluid-tight seal. This tube has been milled on two sides at the objective end to permit viewing and to aid in the circulation of the coolant. 20 and 32 are clamp rings used to seal the borescope housing assembly at the eyepiece end. 22 denotes the outside tube seal sleeve. 24 denotes the member which contains the purge gas inlet and coolant outlet channels. 26 denotes the plate assembly which is shown containing the coolant inlet tubes 27 in place. While such tubes are used in this embodiment, it is not necessary to use a plurality of tubes. One thin-wall tube deformed on a mandrel to the proper curvature may also be used. Also, any spacers or plates which divide the borescope housing assembly into two horizontal compartments, one for the inlet of coolant and one for the outlet of coolant, may be used. It is desirable that there be at least two compartments for these purposes since merely having a stagnant coolant between the borescope housing assembly and the borescope will not suffice to provide the requisite cooling. A flow of coolant, which may be obtained by the embodiment shown or other embodiments discussed, is necessary. Numeral 34 denotes the outer protective tubing shroud provided with openings at 39 and 41.

In FIG. 2, numeral 38 denotes a glass tube. The tube may be of any transparent substance, and a tube made of a non-transparent substance with a transparent window or windows may also be used. 40 denotes end plates, and 42 the tie rods which hold this assembly together. The coolant circulates around this assembly. When assembled, this cage assembly will be aligned with the openings milled in the objective end of the outer pressure tube 18.

FIG. 3 shows the optical portion of the borescope assembled inside the inner housing with the inner seal tube and cage assembly in place. This device is inserted during assembly so that the objective section is aligned as previously discussed and the eyepiece is accessible at the opposite end of the borescope housing assembly for use by the observer or photographer.

FIG. 4 shows one method of bringing coolant to the objective end of the borescope and insuring a flow of coolant to avoid stagnation. As previously discussed, other embodiments may be utilized for the same purpose. Requirements of space are of importance in determining which method of bringing coolant to the objective and returning coolant to the outlet are to be used. All joints and holes in the inner housing should be sealed against liquid entry in any convenient manner, such as with tape or epoxy cement or other sealing material.

Figure 5:
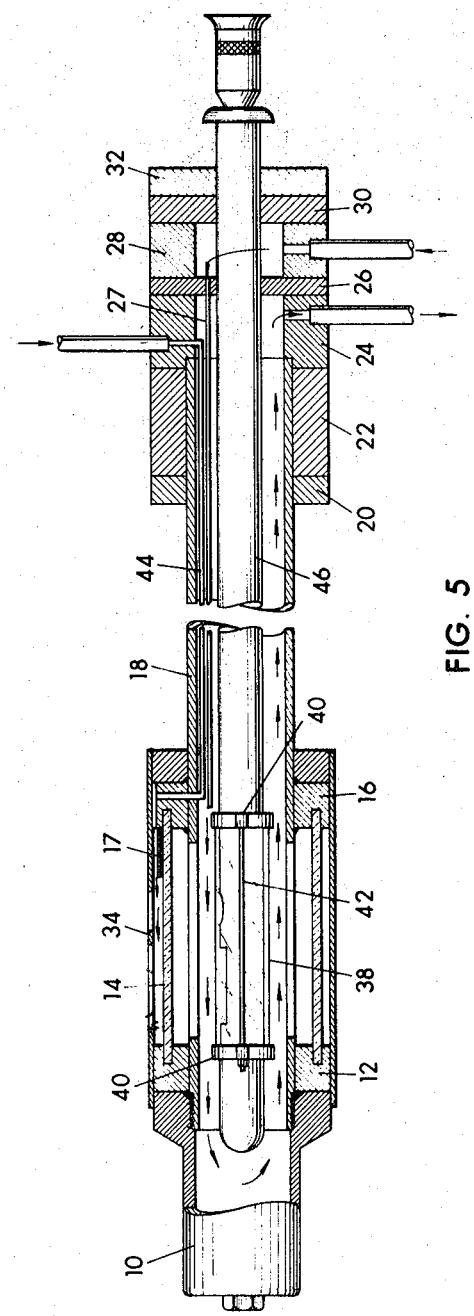
FIG. 5 is a partial cross-section of FIG. 1 in combination with FIG. 3.

FIG. 5 shows the external housing in partial cross-tion with the optical system enclosed in the inner housing in place. Numeral 44 denotes the purge gas line, 46 the boroscope inner housing.

Although the figures show a right angle borescope with an integral illumination system, this is not to be construed as in any way limiting the invention to uses with such optical and illuminating systems.

When in use, the borescope is inserted into the vessel to be observed through an existing or hot-tapped pipe connection, and is secured through use of a stuffing box-packing gland or other convenient arrangement.

Coolant is circulated and where necessary purge gas is used to clear the objective end of the outer borescope housing assembly by flowing over the exterior surface of the outer objective tube 14 and out through openings 39 and 41. The deflector 17 causes this flow to be deflected so that turbulent flow over the external surface of tube 14 results. That is, the gas stream in conduit 44 is laminar. As it moves downstream the laminar flow regime passes over the outer objective tube 14. As the stream flows over the tube 14, the deflector 17 interrupts the laminar stream so that turbulence results. As a turbulent stream the gas is able to impinge, clear off, and prevent the accumulation of foreign material that may deposit on the objective tube 14. The same gas stream, in laminar flow, would not be able to accomplish these results to the same extent as under turbulent flow. On the other hand, a stream of the same gas possessing the same degree of turbulence, flowing in the same space, without the deflector 17, would require much higher velocities. At these velocities it is conceivable that the outer objective tube 14 might not be able to withstand the momentum of such a turbulent high velocity flow regime. It should be appreciated that it is well known in the fluid mechanics art that a body disposed in a laminar stream will create eddies and result in a turbulent stream downstream thereof.

The use of this device for observation of interiors containing gases, liquids, powders, or other material in all types of operations apparatus and processes is contemplated and is within the spirit of the invention.

What is claimed is:

1. In combination, an optical borescope and protective housing means for protecting said borescope and permitting use of said borescope in severe environment, said combination comprising:
    (a) an optical borescope which includes an objective, a middle lens system and an eye piece contained in an inner housing sealed against entry of fluids;
    (b) a protective housing means in which said borescope is disposed;
    (c) a window means disposed over said objective whereby said objective is protected from the leakage of fluids;
    (d) fluid inlet and outlet means disposed on said protective housing means for the inflow and outflow of a fluid coolant which flows about the window means whereby said objective is maintained at a tolerable temperature;
    (e) an outer objective tube disposed around said window means of said borescope;

(f) an outer protective shroud provided with at least one opening and disposed around said outer objective tube on the surface of said housing;

(g) a purge gas source directed to the space between said outer objective tube and said outer protective shroud to remove contaminants from the exterior surface of said outer objective tube; and (h) a purge gas deflector means disposed on said outer objective tube in the space between said outer objective tube and said outer protective shroud, whereby said purge gas flows over said outer objective tube in turbulent flow.

2. The combination of claim 1 including means for circulating said fluid coolant around said borescope, said means comprising at least one elongated tube disposed in the space between said borescope and said housing means, said tube connected at one end to said fluid inlet means and extended therefrom to said window means whereby coolant is conducted to said window means and therefrom to said outlet means.

3. The combination of claim 1 including means for circulating said fluid coolant around said borescope, said means comprising a plurality of elongated tubes mounted at said fluid inlet means in a plate assembly and extending therefrom to said window means whereby said coolant is conducted to the window means and therefrom to said fluid outlet means.

4. The combination of claim 1 wherein said deflector means comprises an asbestos covered semi-circular flexible wire having both ends anchored on said outer objective tube.

References Cited

UNITED STATES PATENTS

| | | | |
|---|---|---|---|
| 3,402,418 | 9/1968 | Le Roy | 73—324X |
| 3,453,049 | 7/1969 | Wager | 73—324X |
| 2,959,090 | 11/1960 | Davies | 350—63 |
| 3,027,644 | 4/1962 | Piscitelli | 350—61 |
| 3,321,265 | 5/1967 | Clave et al. | 350—63 |

FOREIGN PATENTS

| | | | |
|---|---|---|---|
| 1,013,049 | 12/1965 | Great Britain | 15—317 |
| 402,189 | 11/1933 | Great Britain | 15—250.04 |

PAUL R. GILLIAM, Primary Examiner